US011041081B2

(12) United States Patent
Ogura (10) Patent No.: US 11,041,081 B2
(45) Date of Patent: Jun. 22, 2021

(54) AQUEOUS INK COMPOSITION FOR WRITING INSTRUMENT

(71) Applicant: MITSUBISHI PENCIL COMPANY, LIMITED, Tokyo (JP)

(72) Inventor: Kousuke Ogura, Kanagawa (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 394 days.

(21) Appl. No.: 16/303,875

(22) PCT Filed: May 24, 2017

(86) PCT No.: PCT/JP2017/019413
§ 371 (c)(1),
(2) Date: Nov. 21, 2018

(87) PCT Pub. No.: WO2017/204259
PCT Pub. Date: Nov. 30, 2017

(65) Prior Publication Data
US 2020/0317941 A1    Oct. 8, 2020

(30) Foreign Application Priority Data

May 25, 2016  (JP) .............................. JP2016-104301
Jun. 24, 2016  (JP) .............................. JP2016-126036
Jun. 30, 2016  (JP) .............................. JP2016-130971

(51) Int. Cl.
*C09D 11/20* (2006.01)
*B43K 7/02* (2006.01)
*B43K 8/02* (2006.01)

(52) U.S. Cl.
CPC ................ *C09D 11/20* (2013.01); *B43K 7/02* (2013.01); *B43K 8/024* (2013.01)

(58) Field of Classification Search
CPC ......... C09D 11/16; C09D 11/17; C09D 11/18; C09D 11/20; B43K 8/024; B43K 7/02
See application file for complete search history.

(56) References Cited

U.S. PATENT DOCUMENTS

| 5,942,560 A | 8/1999 | Idogawa et al. |
| 5,961,704 A | 10/1999 | Nakamura et al. |
| 5,965,634 A * | 10/1999 | Idogawa ................. C09D 11/16 523/161 |

(Continued)

FOREIGN PATENT DOCUMENTS

| JP | 62-225578 A | 10/1987 |
| JP | 04-309572 A | 11/1992 |
| JP | 07-034023 A | 2/1995 |

(Continued)

*Primary Examiner* — Erin Deery
(74) *Attorney, Agent, or Firm* — Foley & Lardner LLP (57) ABSTRACT

Provided is aqueous ink composition for a writing instrument, which contains water and microspheres having a water-insoluble dye and a matrix constituted from a polymer wherein the water-insoluble dye is higher densely present in the inner part of the matrix than at the surface of the matrix, and at least one of the following (a) and (b) is satisfied: (a) the circularity coefficient of the microspheres, as measured by image analysis, is 0.6-1.0, and (b) the 10% strength of the microspheres, as determined in a micro-compression test, is 5-30 MPa.

7 Claims, 1 Drawing Sheet

(56) References Cited

U.S. PATENT DOCUMENTS 6,126,731 A    10/2000  Kemeny et al.

FOREIGN PATENT DOCUMENTS

| JP | 10-176130 A   | 6/1998  |
| JP | 10-259337 A   | 9/1998  |
| JP | 10-292146 A   | 11/1998 |
| JP | 2001-089510 A | 4/2001  |
| JP | 2004-189900 A | 8/2004  |
| JP | 2006-232887 A | 9/2006  |

* cited by examiner

AQUEOUS INK COMPOSITION FOR WRITING INSTRUMENT

The present application is the U.S. National Stage application of PCT/JP2017/019413, filed May 24, 2017, which claims priority from Japanese application nos. JP 2016-104301, filed May 25, 2016, JP 2016-126036, filed Jun. 24, 2016, and JP 2016-130971, filed Jun. 30, 2016.

FIELD

The present invention relates to an aqueous ink composition for a writing instrument.

BACKGROUND

Dyes and pigments are known as coloring components of aqueous ink used in writing instruments such as aqueous ballpoint pens.

Inks using dye have the shortcoming of so-called inferior water resistance in which characters and drawn lines become smeared or removed by perspiration or water causing the characters and drawn lines to become illegible due to the water-soluble property of the dye. In addition, since light resistance of the dye per se is inferior, these inks also have the shortcoming of characters and drawn lines deteriorating over a long period of time. On the other hand, although inks using pigment do not have problems relating to water resistance or light resistance, there is the problem of requiring different dispersion treatment for each pigment due to differences in such factors as material, size or specific gravity depending on the type of pigment. In particular, when pigments of different hues are mixed and adjusted to obtain a desired hue, the stability of the ink is frequently impaired due to differences in the properties thereof. In order to solve such problems, various inks have been proposed that employ colored resins or microencapsulation using dye or pigment.

Patent document 1 discloses an aqueous ink composition characterized by the use of colored microspheres of a polyacrylic acid derivative having a particle diameter of 10 μm or less as a colorant. In Patent document 1, microspheres of a polyacrylic acid derivative are colored by dyeing the microspheres with an acidic dye or basic dye.

Patent document 2 discloses an ink for a writing instrument characterized by being an aqueous dispersion that uses polyester particles colored with a dye or pigment that contain ionic groups over a range of 20 eq/ton to 1000 eq/ton as a dispersoid. In Patent document 2, the polyester particles are colored by high-temperature dispersion dyeing.

Patent document 3 discloses an aqueous liquid dispersion of colored resin particles for an aqueous ink. Here, the liquid dispersion is prepared by emulsion polymerization of a vinyl monomer having an acidic functional group in which a water-soluble basic dye has been dissolved in the presence of a polymerizable surfactant.

Patent document 4 discloses an aqueous marking pen ink for a writing board in the form of a composition containing a colorant, resin, erasability imparting agent and water. In this aqueous marking pen ink for a writing board, the colorant consists of microcapsules enclosing a coloring element selected from an oil-soluble dye, disperse dye and pigment or a colored body obtained by dispersing or dissolving a coloring element in an oil-based medium, and these microcapsules are dispersed in an aqueous medium. Patent document 4 discloses that methyl ethyl ketone is used as the oil-based medium enclosed by the microcapsules.

CITATION LIST

Patent Literature

[Patent document 1]: JP-S62-225578A
[Patent document 2]: JPH7-34023A
[Patent document 3]: JPH10-259337A
[Patent document 4]: JPH10-292146A

SUMMARY

Problem to be Solved by the Invention

Applications of ink for writing instruments may require hiding power (color force) provided by coloring. However, regarding the inks described in Patent document 1 and Patent document 3, the desired hiding power cannot be realized and/or the water-soluble dye within or on the surface of the particles may end up seeping into water or other aqueous medium, thereby partially impairing the fastness of characters and drawn lines.

In addition, when an aspect is employed that colors particles with a dye as in Patent document 1 and Patent document 2, since the particles are unable to contain a large amount of dye, the desired color force may be unable to be realized.

Moreover, in the case of using the aqueous marking pen ink for a writing board instrument described in PTL4 to write on paper in particular, the desired initial writability and writing feel as well as the desired rubfastness of drawn lines may be unable to be obtained.

Thus, there is a need to provide an aqueous ink composition for a writing instrument that allows the obtaining of a desired color force, and in the case of using to write on paper, allows the obtaining of the desired initial writability and writing feel and/or demonstrates superior rubfastness of drawn lines written on paper.

Means for Solving the Problem

As a result of conducting extensive studies, the inventors of the present invention found that the aforementioned problems can be solved by the following means, thereby leading to completion of the present invention. Namely, the present invention is as described below.

(1) An aqueous ink composition for a writing instrument, containing:
water, and
microspheres each having a matrix composed of a polymer and a water-insoluble dye;
wherein the water-insoluble dye is more densely present within the matrix than on the surface of the matrix, and
wherein the aqueous ink composition satisfies at least one of the following (a) and (b):
(a) circularity coefficient of the microspheres as measured by image analysis is 0.6 to 1.0, and
(b) 10% strength of the microspheres as determined by a micro-compression test is 5 MPa to 30 MPa.

(2) The aqueous ink composition for a writing instrument described in (1) above, wherein the dispersion degree coefficient of the microspheres as measured by laser diffraction is 1.0 to 1.8.

(3) The aqueous ink composition for a writing instrument described in (1) or (2) above, wherein the content of the water-insoluble dye in the microspheres is 10 mass % to 45 mass %.

(4) The aqueous ink composition for a writing instrument described in any one of (1) to (3) above, wherein the mean particle diameter of the microspheres when measured by laser diffraction is 0.3 µm to 3.0 µm.

(5) An aqueous ink composition for a writing instrument, containing: at least two types of the microspheres described in any one of (1) to (4) above, wherein the matrix of one type of microspheres and the matrix of another type of microspheres are composed with the same type of polymer, and wherein the water-insoluble dye of one type of microspheres and the water-insoluble dye of another type of microspheres are different.

(6) A writing instrument, wherein the writing instrument at least comprises an ink reservoir, a writing portion and a held portion, and wherein the ink reservoir stores the aqueous ink composition for a writing instrument described in any one of (1) to (5) above.

Effects of the Invention

According to aspect of (a) of the present invention, an aqueous ink composition for a writing instrument can be provided that allows the obtaining of a desired color force, and in the case of using to write on paper, allows the obtaining of the desired initial writability and writing feel.

According to aspect (b) of the present invention, an aqueous ink composition for a writing instrument can be provided that allows the obtaining of a desired color force and demonstrates superior rubfastness of drawn lines written on paper.

EMBODIMENTS FOR CARRYING OUT THE INVENTION

<<Aqueous Ink Composition for a Writing Instrument>>

The aqueous ink composition for a writing instrument of the present invention contains water and microspheres. The microspheres each have a matrix composed with a polymer and a water-insoluble dye. This water-insoluble dye is more densely present within the matrix than on the surface of the matrix.

The aqueous ink composition for a writing instrument of the present invention satisfies at least one of the following (a) and (b):

(a) circularity coefficient of the microspheres as measured by image analysis is 0.6 to 1.0, and (b) 10% strength of the microspheres as determined by a micro-compression test is 5 MPa to 30 MPa.

The inventors of the present invention found that, as a result of the aqueous ink composition for a writing instrument employing a composition that satisfies the aforementioned (a), a desired color force can be obtained, and that in the case of using to write on paper, a desired initial writability and writing feel are obtained. Without being bound by theory, this is thought to be caused by being able to prevent dye and matrix components from seeping into water by composing the microspheres with a water-insoluble component. As a result of preventing the dye from seeping out, the aforementioned circularity can be retained, and this is thought to enable the realization of desired initial writability and writing feel as well as enable favorable retention of dye within the microspheres, thereby making it possible to retain fastness of characters and drawn lines as well as the content of the dye within the microspheres.

In addition, the inventors of the present invention found that, as a result of the aqueous ink composition for a writing instrument employing a composition that satisfies the aforementioned (b), a desired color force can be obtained, and in the case of using to write on paper, drawn lines are obtained that demonstrate superior rubfastness. Without being bound by theory, this is thought to be due to the microspheres becoming increasingly deformed when the aqueous ink composition is written on paper and easily slipping between the fibers on the surface of the paper as the aforementioned 10% strength decreases, thereby resulting in favorable rubfastness of drawn lines.

Moreover, the inventors of the present invention further found that the aforementioned 10% strength is preferably 5 MPa or more from the viewpoint of stabilizing outflow of ink. Without being bound by theory, this is thought to be due to the shape stability of the microspheres improving as the aforementioned 10% strength increases, thereby enabling the ink to flow out more stably.

Namely, as a result of making the aforementioned 10% strength to be 5 MPa to 30 MPa, favorable initial writability and favorable rubfastness of drawn lines are thought to be able to be balanced.

The aqueous ink composition for a writing instrument of the present invention may also contain at least two types of microspheres. In this case, the matrix of one type of microspheres and the matrix of another type of microspheres are preferably composed with the same type of polymer. In addition, the water-insoluble dye of one type of microspheres and the water-insoluble dye of another type of microspheres may be different.

As a result of composing the matrices of the microspheres with the same type of polymer, parameters such as the material, size and specific gravity of the microspheres can be aligned to substantially the same extent, thereby facilitating uniform dispersion of the microspheres in the aqueous ink composition for a writing instrument and as a result thereof, easily allowing the obtaining of a desired hue by mixing colors.

The content ratio of microspheres in the aqueous ink composition for a writing instrument of the present invention can be 5 mass % or more, 7 mass % or more or 10 mass % or more and can be 45 mass % or less, 40 mass % or less or 35 mass % or less. If the content ratio of microspheres is less than 5 mass %, color force may be insufficient, while if the content ratio of microspheres exceeds 45 mass %, ink fluidity may decrease.

The following provides an explanation of each constituent of the aqueous ink composition for a writing instrument of the present invention.

<Water>

The water can be ion exchange water or distilled water and the like.

<Microspheres>

The microspheres each have a matrix and a water-insoluble dye.

Figure 1:
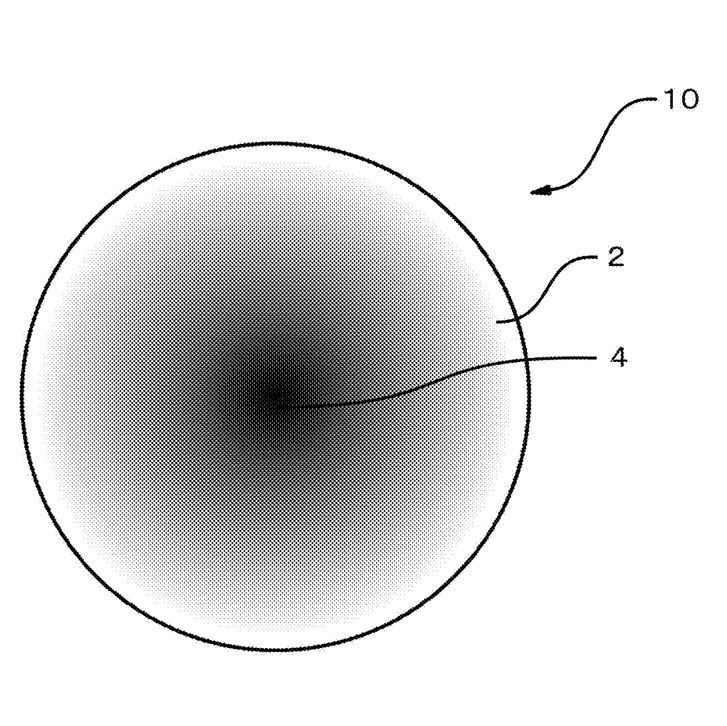
FIG. 1 is a schematic cross-sectional view of a microsphere in the aqueous ink composition for a writing instrument of the present invention.

This water-insoluble dye (4) is present more densely within the matrix (2) than on the surface of the matrix (2) as shown in FIG. 1. As a result of the matrix (2) appearing on the surface of a microsphere (10), the properties of the surface of each microsphere (10) can be uniformed, thereby resulting in more stable dispersion.

The circularity coefficient, as measured by image analysis, of the microspheres in a aqueous ink composition for a writing instrument that satisfies (a) is 0.6 to 1.0. Here, image analysis can be carried out using, for example, Mac-View available from Mountech Co., Ltd. In this case, the average value of 500 particles is used for the value of circularity coefficient.

This circularity coefficient can be calculated from the formula: $\{4\pi \times (\text{area of a microsphere depicted in an image})\}/(\text{perimeter of a microsphere depicted in an image})^2$. The circularity coefficient calculated according to this formula approaches 1 as the shape of the microsphere depicted in an image approaches a perfect circle, and has a value of 1 in the case the shape of a microsphere depicted in an image is a perfect circle.

This circularity coefficient can be 0.6 or more, 0.8 or more or 0.9 or more and can be 1.00 or less, 0.98 or less or 0.95 or less. As a result of the circularity coefficient being within the aforementioned ranges, a desired initial writability and writing feel of the aqueous ink composition for a writing instrument of the present invention can be realized.

Adjustment of this circularity coefficient can be carried out, for example, by adjusting the content of polymer composing the matrices or by adjusting the amount of organic solvent that dissolves the water-insoluble dye.

The 10% strength of the microspheres in the aqueous ink composition for a writing instrument of the present invention, as measured by a micro-compression test, is 30 MPa or less. Here, the micro-compression test can be carried out using, for example, the MCT-510 manufactured by Shimadzu Corp. In this case, the average value of 5 particles is used for the value of 10% strength.

This 10% strength can be calculated according to the equation indicated below:

$$C(x) = (2.48 \times P)/(\pi \times d^2)$$

(wherein, $C(x)$ represents 10% strength (MPa), P represents testing force (N) during 10% displacement of particle diameter, and d represents particle diameter (mm)).

As a result of this 10% strength being 30 MPa or less, 25 MPa or less or 20 MPa or less, favorable rubfastness can be obtained for lines drawn with the aqueous ink composition for a writing instrument of the present invention.

In addition, making this 10% strength to be 5 MPa or more, 6 MPa or more or 7 MPa or more makes it possible to further obtain favorable initial writability of the aqueous ink composition for a writing instrument of the present invention, thereby making this preferable.

Adjustment of this 10% strength can be carried out by adjusting the content of polymer that composes the matrices or by adding an auxiliary monomer or auxiliary prepolymer when producing the matrices.

The dispersion degree coefficient of the microspheres as measured by laser diffraction may be 1.0 to 1.8. Here, the measurement by the laser diffraction method can be carried out under the condition of a refractive index of 1.8 using the HRA9320-X100 Particle Size Distribution Analyzer (manufactured by Nikkiso Co., Ltd.).

This dispersion degree coefficient can be calculated according to the formula: volume-based mean diameter of microspheres/number-based mean diameter of microspheres. This dispersion degree coefficient becomes 1 in the case of monodisperse particles consisting of particles having the same particle size, and variations in particle diameter increase as this value becomes larger.

This dispersion degree coefficient can be 1.0 or more, 1.1 or more or 1.2 or more and can be 1.8 or less, 1.5 or less or 1.3 or less. As a result of this dispersion degree coefficient being within the aforementioned ranges, excessive enhancement of the degree of filling of the microspheres can be prevented, thereby making it possible to demonstrate favorable initial writability.

Adjustment of this dispersion degree coefficient can be carried out by, for example, adjusting the content of polymer composing the matrices or adjusting the temperature during polymerization or polymerization time.

According to the composition of the aqueous ink composition for a writing instrument of the present invention, a large amount of water-insoluble dye can be contained in the microspheres. More specifically, the content ratio of water-insoluble dye in the microspheres can be 10 mass % or more, 20 mass % or more or 30 mass % or more and can be 45 mass % or less, 40 mass % or less or 35 mass % or less. This content ratio can be calculated according to the formula: (parts by mass of water-insoluble dye)/{(parts by mass of water-insoluble dye)+(parts by mass of polymer)}×100.

Making the mean particle diameter of the microspheres when measured by laser diffraction to be 0.3 μm or more, 0.5 μm or more or 1.0 μm or more is preferable from the viewpoint of expressing a desired color force and preventing a phenomenon that causes drawn lines to become shiny and colors to fade on the back side of paper, while making the mean particle diameter to be 3.0 μm or less, 2.5 μm or less or 2.0 μm or less is preferable from the viewpoint of not causing handwriting to become blurred. Mean particle diameter as referred to here is the value of D50 as calculated by laser diffraction on the basis of volume.

Here, measurement of mean particle diameter by laser diffraction can be carried out using, for example, the HRA9320-X100 Particle Size Distribution Analyzer manufactured by Nikkiso Co., Ltd.

{Matrix}

The matrix is composed with a polymer.

(Polymer)

The polymer that composes the matrices can be, for example, an epoxy polymer, melamine polymer, acrylic polymer, urethane polymer, urea polymer or combination thereof.

{Water-Insoluble Dye}

The water-insoluble dye is a dye that is insoluble in water at normal temperature, although a salt-forming dye, disperse dye or oil-soluble dye, for example, can be used, a salt-forming dye is used preferably from the viewpoint of chromogenicity.

Examples of salt-forming dyes that can be used include dyes having a chemical structure of azo-based, metal complex azo-based, anthraquinone-based or metal phthalocyanine-based dyes such as Valifast® Black 1807, Valifast® Blue 2620, Valifast® Brown 2402, Valifast® Green 1501, Valifast® Orange 2210, Valifast® Pink 2310, Valifast® Red 1355, Valifast® Violet 1701 or Valifast® Yellow 1101 manufactured by Orient Chemical Industries Co., Ltd.

Examples of disperse dyes that can be used include at least one type of dye selected from C.I. Disperse Yellow 198, C.I. Disperse Yellow 42, C.I. Disperse Red 92, C.I. Disperse Violet 26, C.I. Disperse Violet 35, C.I. Disperse Blue 60 and C.I. Disperse Blue 87.

Examples of oil-soluble dyes that can be used include Oil Black 860, Oil Blue 613, Oil Brown BB, Oil Green 530, Oil Orange 201, Oil Pink 312, Oil Red 5B, Oil Scarlet 318 and Oil Yellow 105 manufactured by Orient Chemical Industries Co., Ltd.

<Other Components>

The aqueous ink composition for a writing instrument of the present invention may also contain various additives such as a corrosion inhibitor, preservative, pH adjuster, lubricant, humectant, resin or thickener such as a natural polysaccharide.

<<Writing Instrument>>

The writing instrument of the present invention comprises at least an ink reservoir, a writing portion and a held portion. The aqueous ink composition for a writing instrument of the present invention is stored in this ink reservoir. The writing instrument of the present invention may be a felt-tip pen or ballpoint pen.

In the present description, a "felt-tip pen" refers to a pen having a mechanism by which ink stored in the ink reservoir is supplied to a plastic writing portion by capillary phenomenon, and includes pens referred to as "marking pens" by a person with ordinary skill in the art. In addition, in the present description, a "ballpoint pen" refers to a pen having a mechanism by which ink stored in the ink reservoir is exuded from the ink reservoir by the rotation of a ball provided in the writing portion.

<Ink Reservoir>

The ink reservoir stores the aforementioned aqueous ink composition for a writing instrument.

Any arbitrary ink reservoir can be used as the ink reservoir provided it is able to store ink and supply ink to the writing portion.

<Writing Portion>

The writing portion may be composed of any arbitrary material corresponding to the application of the writing instrument. In the case the writing instrument of the present invention is a felt-tip pen, examples of the writing portion include those having a fiber core or plastic core. In the case the writing instrument of the present invention is a ballpoint pen, the writing portion can be a writing portion comprising a ballpoint pen tip on the tip thereof.

<<Method for Producing Aqueous Ink Composition for a Writing Instrument of the Present Invention>>

The method for producing the aqueous ink composition for a writing instrument of the present invention can include a microsphere production step and an ink composition preparation step.

<Microsphere Production Step: Emulsion Polymerization Method>

The microsphere production step using emulsion polymerization comprises producing an oil phase, producing an aqueous phase, and mixing the oil phase and aqueous phase to emulsify the oil phase and then polymerize the oil phase components.

{Oil Phase}

The oil phase contains an organic solvent, water-insoluble dye and monomer or prepolymer. Multiple types of organic solvents may be contained.

This oil phase can be produced by heating the organic solvent to a prescribed temperature, and adding the water-insoluble dye thereto while stirring, followed by adding the monomer or prepolymer thereto and further optionally adding another organic solvent thereto.

(Organic Solvent)

Solubility of the organic solvent in water at 25° C. can be 0.1 g/100 g or more, 1 g/100 g or more, 3 g/100 g or more or 5 g/100 g or more and can be 40 g/100 g or less, 35 g/100 g or less, 30 g/100 g or less or 25 g/100 g or less.

This solubility is preferably 0.1 g/100 g or more, 1 g/100 g or more, 3 g/100 g or more or 5 g/100 g or more from the viewpoint of favorably dispersing the dye, and is preferably 15 g/100 g or less, 14 g/100 g or less, 13 g/100 g or less or 10 g/100 g or less from the viewpoints of inhibiting precipitation of dye and resin and obtaining favorable circularity.

Organic solvents such as phenyl glycol, benzyl alcohol, ethylene glycol monobenzyl ether or ethyl acetate can be used as organic solvent having solubility that satisfies the aforementioned ranges.

In addition, an organic solvent having solubility in water at 25° C. of less than 0.1 g/100 g may also be additionally used as organic solvent. Examples of such solvents include alkyl sulfonic phenyl ester, ethyl hexyl phthalate, tridecyl phthalate, ethyl hexyl trimellitate, diethylene glycol dibenzoate, dipropylene glycol dibenzoate and liquid xylene resin.

(Water-Insoluble Dye)

A water-insoluble dye listed as an example in relation to the microspheres can be used as the water-insoluble dye.

(Monomer or Prepolymer)

Various types of monomers or polymers are suitably selected for the monomer or prepolymer that composes the polymer corresponding to the particular objective. Examples of monomers or prepolymers that can be used include melamine monomers or prepolymers, epoxy monomers or prepolymers, acrylic monomers or prepolymers and isocyanate monomers or prepolymers.

Examples of melamine monomers or prepolymers that can be used include melamine, melamine cyanurate, ethylene dimelamine and methylol melamine.

Examples of epoxy monomers or prepolymers that can be used include allyl glycidyl ether and bisphenol A-epichlorhydrin prepolymer.

Examples of acrylic monomers or prepolymers that can be used include (meth)acrylic acid, methyl (meth)acrylate, ethyl (meth)acrylate, propyl (meth)acrylate, butyl (meth)acrylate, isobutyl acrylate, pentyl (meth)acrylate, hexyl (meth)acrylate and 2-ethylhexyl (meth)acrylate.

Examples of isocyanate monomers or prepolymers that can be used include hexamethylene diisocyanate, tolylene diisocyanate, diphenylmethane diisocyanate, xylylene diisocyanate, isophorone diisocyanate and isocyanate prepolymers.

The use of a triol adduct, modified isocyanurate or other trimer of the aforementioned isocyanates for the isocyanate prepolymer is preferable from the viewpoint of favorably curing the microspheres by polymerization. In addition, the use of a dimer such as a modified allophanate of the aforementioned isocyanates as an auxiliary prepolymer together with the aforementioned trimer may be preferable since the circularity coefficient can be decreased and 10% strength can be lowered.

{Aqueous Phase}

The aqueous phase can be produced by mixing water and a dispersant. Examples of dispersants that can be used include, but are not limited to, polyvinyl alcohol.

{Emulsification and Polymerization Step}

The step for emulsifying and then polymerizing the oil phase components can be carried out by adding the oil phase to the aqueous phase and emulsifying and mixing them using a homogenizer etc. while heating to a prescribed temperature.

{Other Steps}

The microsphere production step may also include other steps such as a step for classifying the microspheres.

\<Microsphere Production Step: Phase Separation Method\>

The microsphere production step using phase separation is composed of the production of a dye-containing solution, production of a protective colloid agent-containing solution, and polymerization of a monomer or prepolymer.

{Production of Dye-Containing Solution}

The dye-containing solution can be produced by heating and dissolving a water-insoluble dye in an organic solvent. The examples of water-insoluble dyes and organic solvents used in relation to the microsphere production step using emulsion polymerization can also be used as the water-insoluble dye and organic solvent in this step.

{Production of Protective Colloid Agent-Containing Solution}

The protective colloid agent-containing solution can be produced by dissolving a protective colloid agent in water.

A protective colloid agent such as methyl vinyl ether-maleic anhydride copolymer can be used as the protective colloid agent.

{Polymerizing Monomer or Prepolymer}

Polymerizing the monomer or prepolymer can be carried out by adding the dye-containing solution to the protective colloid agent-containing solution heated to a prescribed temperature and dispersing in oil droplets followed by adding the monomer or prepolymer thereto and stirring while maintaining at that temperature. According thereto, the water-insoluble dye is enclosed in the polymer obtained by polymerizing the monomer or prepolymer.

The examples of monomers and prepolymers used in relation to producing the microsphere using emulsion polymerization can also be used as the monomer or prepolymer in this step.

\<Preparing Ink Composition\>

Preparing the ink composition can be carried out according to a conventionally known method while mixing the resulting microspheres and other components composing the aqueous ink composition for a writing instrument using a stirrer such as a disperser.

EXAMPLES

Although the following provides a detailed explanation of the present invention through examples and comparative examples, the present invention is not limited thereto.

\<\<Production of Aqueous Ink Composition for Writing Instrument\>\>

\<Production of Microspheres\>

{Microspheres A}

(Production of Oil Phase Solution)

3.5 parts by mass of an oil-soluble black dye (Oil Black 860, Orient Chemical Industries Co., Ltd.) as a water-insoluble dye were added to 12.5 parts by mass of ethyl acetate as an organic solvent while heating to 60° C. followed by adequately dissolving therein. Then, 8 parts by mass of a modified isocyanurate of hexamethylene diisocyanate (TLA-100, Asahi-Kasei Chemicals Corp.) as a prepolymer were added thereto to produce an oil phase solution.

(Production of Aqueous Phase Solution\>

15 parts by mass of polyvinyl alcohol (PVA-205, Kuraray Co., Ltd.) as a dispersant were dissolved in 200 parts by mass of distilled water while heating to 60° C. to produce an aqueous phase solution.

(Emulsion Polymerization)

The oil phase solution was added to the aqueous phase solution at 60° C. followed by emulsification and mixing by stirring for 6 hours with a homogenizer to complete polymerization. Microspheres were recovered by centrifuging the resulting dispersion to obtain Microspheres A.

{Microspheres B}

Microspheres B were obtained in the same manner as Microspheres A with the exception of changing the amount of ethyl acetate from 12.5 parts by mass to 25 parts by mass.

{Microspheres C}

Microspheres C were obtained in the same manner as Microspheres B with the exception of changing the heating temperature during emulsion polymerization from 60° C. to 90° C. and changing the stirring time from 6 hours to 3 hours.

{Microspheres D}

Microspheres D were obtained in the same manner as Microspheres A with the exception of changing the amount of the modified isocyanurate of hexamethylene diisocyanate from 8 parts by mass to 6 parts by mass.

{Microspheres E}

Microspheres E were obtained in the same manner as Microspheres A with the exception of changing the amount of the modified isocyanurate of hexamethylene diisocyanate from 8 parts by mass to 15 parts by mass.

{Microspheres F}

Microspheres F were obtained in the same manner as Microspheres A with the exception of changing the amount of the modified isocyanurate of hexamethylene diisocyanate from 8 parts by mass to 4 parts by mass.

{Microspheres G}

Microspheres G were obtained in the same manner as Microspheres A with the exception of changing the 3.5 parts by mass of water-insoluble dye (Oil Black 860, Orient Chemical Industries Co., Ltd.) to 2.8 parts by mass of water-insoluble dye (Valifast Red 1355, Orient Chemical Industries Co., Ltd.), changing the 12.5 parts by mass of ethyl acetate to 11.5 parts by mass of ethylene glycol monobenzyl ether, and changing the 8 parts by mass of the modified isocyanurate of hexamethylene diisocyanate (TLA-100, Asahi-Kasei Chemicals Corp.) to 7.2 parts by mass of a trimethylolpropane (1 mole) adduct of diphenylmethane diisocyanate (3 moles) (D-109, Mitsui Chemicals, Inc.).

{Microspheres H}

Microspheres H were obtained in the same manner as Microspheres E with exception of changing the heating temperature during emulsion polymerization from 60° C. to 90° C. and changing the stirring time from 6 hours to 3 hours.

{Microspheres I}

Microspheres I were obtained in the same manner as Microspheres G with the exception of changing the amount of the trimethylolpropane (1 mole) adduct of diphenylmethane diisocyanate (3 moles) from 7.2 parts by mass to 9.6 parts by mass.

{Microspheres J}

Microspheres J were obtained in the same manner as Microspheres G with the exception of changing the amount of the isocyanate compound from 7.2 parts by mass to 1.2 parts by mass and further adding 6.0 parts by mass of an auxiliary prepolymer in the form of a modified allophanate of hexamethylene diisocyanate (D-178L, Mitsui Chemicals, Inc.).

{Microspheres K}

Microspheres K were obtained in the same manner as Microspheres G with the exception of changing the amount of the isocyanate compound from 7.2 parts by mass to 3.6 parts by mass.

{Microspheres L}

(Production of Dye-Containing Solution)

2.4 parts by mass of a water-insoluble dye (Valifast Blue 2620, Orient Chemical Industries Co., Ltd.) were dissolved in 9.6 parts by mass of benzyl alcohol as an organic solvent while heating to 70° C. and stirring to prepare a dye-containing solution.

(Production of Protective Colloid Agent-Containing Solution)

40 parts by mass of methyl vinyl ether-maleic anhydride copolymer (Gantrez AN-179, ISP Corp.) as a protective colloid agent were dissolved in water followed by adjusting the pH to 4 with sodium hydroxide and bringing to a total of 200 parts by mass to produce a protective colloid agent-containing solution.

(Monomer Polymerization)

The dye-containing solution was added to the protective colloid agent-containing solution and dispersed in oil droplets while heating at 70° C. and stirring, followed by gradually adding 7.6 parts by mass of methylol melamine (Nicaresin S-260, Nippon Carbide Industries Co., Inc.) as a monomer and heating and stirring for 50 minutes while maintaining the temperature to polymerize the methylol melamine and obtain a microsphere dispersion. After cooling this dispersion to normal temperature, addition of acid, filtration and rinsing with water were carried out followed by drying using a spray dryer to obtain Microspheres L.

{Microspheres M}

Microspheres M were obtained in the same manner as Microspheres L with the exception of changing the amount of benzyl alcohol from 9.6 parts by mass to 20 parts by mass.

{Microspheres N}

Microspheres N were obtained in the same manner as Microspheres M with the exception of changing the heating temperature during polymerization of the methylol melamine from 70° C. to 90° C. and changing the stirring time from 50 minutes to 20 minutes.

{Microspheres O}

Microspheres O were obtained in the same manner as Microspheres L with the exception of changing the amount of methylol melamine from 7.6 parts by mass to 9.6 parts by mass and changing the amount of benzyl alcohol from 9.6 parts by mass to 20 parts by mass.

{Microspheres P}

Microspheres P were obtained in the same manner as Microspheres O with the exception of changing the amount of methylol melamine from 7.6 parts by mass to 12.8 parts by mass.

{Microspheres Q}

Microspheres Q were obtained in the same manner as Microspheres L with the exception changing the amount of methylol melamine from 7.6 parts by mass to 3.8 parts by mass.

{Microspheres R}

Microspheres R were obtained in the same manner as Microspheres L with the exception of changing the 2.4 parts by mass of water-insoluble dye (Valifast Blue 2620, Orient Chemical Industries Co., Ltd.) to 4 parts by mass of water-insoluble dye (Valifast Yellow 1101, Orient Chemical Industries Co., Ltd.), changing the 9.6 parts by mass of benzyl alcohol to 16 parts by mass of phenyl glycol, and changing the amount of methylol melamine from 7.6 parts by mass to 8.4 parts by mass.

{Microspheres S}

Microspheres S were obtained in the same manner as Microspheres R with the exception of changing the heating temperature during polymerization of methylol melamine from 70° C. to 90° C. and changing the stirring time from 50 minutes to 20 minutes.

{Microspheres T}

Microspheres T were obtained in the same manner as Microspheres R with the exception of changing the amount of methylol melamine from 8.4 parts by mass to 4.2 parts by mass.

Production of Ink Compositions

Examples 1-5, 7-9, 11 and 13-17 and Comparative Examples 1-3, 5, 6 and 8

100 parts by mass of the aqueous ink compositions for a ballpoint pen of Examples 1 to 5, 7 to 9, and 13 to 17 and Comparative Examples 1 to 3, 5, 6 and 8 were produced using the aforementioned microspheres (15 parts by mass), xanthan gum (Keslan S, Sansho Co., Ltd., 0.18 parts by mass) as a thickener, phosphate ester (Plysurf A219B, DKS Co., Ltd., 0.5 parts by mass), preservative (Bioden 421, Daiwa Chemical Industries Co., Ltd., 0.2 parts by mass), benzotriazole (0.3 parts by mass) as corrosion inhibitor, aminomethyl propanol (0.1 part by mass) as pH adjuster, propylene glycol (15 parts by mass) as solvent and ion exchange water (68.72 parts by mass).

Examples 6, 10 and 12 and Comparative Examples 4 and 7

100 parts by mass of aqueous ink compositions for a felt tip pen of Examples 6, 10 and 12 and Comparative Examples 4 and 7 were produced using the aforementioned microspheres (15 parts by mass), preservative (Bioden 421, Daiwa Chemical Industries Co., 0.2 parts by mass), aminomethyl propanol (0.1 part by mass) as pH adjuster, propylene glycol (3 parts by mass) as solvent and ion exchange water (81.7 parts by mass).

Examples 18 and 19

100 parts by mass of an aqueous ink composition for a ballpoint pen of Example 18 were produced in the same manner as Example 1 with the exception of using Microspheres L (12 parts by mass) and Microspheres R (6 parts by mass) for the microspheres and changing the amount of ion exchange water to 65.72 parts by mass.

100 parts by mass of an aqueous ink composition for a felt tip pen of Example 19 were produced in the same manner as Example 6 with the exception of using Microspheres L (12 parts by mass) and Microspheres R (6 parts by mass) for the microspheres and changing the amount of ion exchange water to 78.7 parts by mass.

<<Evaluations>>

<Microsphere Evaluation>

{Circularity Coefficient}

The circularity coefficients of the resulting microspheres were determined by image analysis using Mac-View available from Mountech Co., Ltd.

{10% Strength}

10% strength of the resulting microspheres was determined using the MCT-510 manufactured by Shimadzu Corp.

{Dispersion Degree Coefficient}

Dispersion degree coefficients of the resulting microspheres were measured by laser diffraction under the condition of a refractive index of 1.8 using the HRA9320-X100 Particle Size Distribution Analyzer manufactured by Nikkiso Co., Ltd.

<Evaluation of Aqueous Ink Compositions for Writing Instruments>

{Production of Writing Instruments}

(Production of Ballpoint Pens)

The aqueous ink compositions for a ballpoint pen of Examples 1 to 5, 7 to 9, 11 and 13 to 18 and Comparative Examples 1 to 3, 5, 6 and 8 were filled into refill cartridges composed of a polypropylene ink reservoir (inner diameter: 4.0 mm, length: 113 mm), stainless steel tip (cemented carbide ball, ball diameter: 0.5 mm) and coupling that connects the reservoir and the tip. Then, ink followers composed of polybutene were attached to the rear ends of the ink. These refill cartridges were installed on the barrel of a ballpoint pen (Signo UM-100, Mitsubishi Pencil Co., Ltd.) to produce aqueous ink ballpoint pens.

(Production of Felt Tip Pens)

Felt tip pens were produced by filling the aqueous ink compositions for a felt tip pen of Examples 6, 10, 12 and 19 and Comparative Examples 4 and 7 into pen bodies of the PM-120T felt tip pen manufactured by Mitsubishi Pencil Co., Ltd. (trade name: "Prockey", pen core: ultrafine core (POM resin core) and fine round core (PET fiber core), to apply similarly hereinafter). The felt tip pens were evaluated as indicated below using fine round cores.

{Evaluation of Initial Writability}

Initial writability was evaluated by first confirming that the writing instrument was able to be used to write handwriting, and after allowing one day to pass after completion of handwriting, the distance from the start of a handwriting test until a drawn line can be written smoothly was measured under conditions of a writing speed of 4.5 m/min, writing angle of 60° (65° in the case of a felt tip pen) and writing load of 100 g (50 g in the case of a felt tip pen) using an automatic writing tester that complies with ISO standard 14145-1, followed by taking the average value of the measurement results of five writing instruments to be the value of initial writability. The evaluation criteria are indicated below.

Evaluation Criteria:

very good: Distance within 2 mm from start of handwriting test until drawn line written smoothly good: Distance within 5 mm from start of handwriting test until drawn line written smoothly moderate: Distance within 10 mm from start of handwriting test until drawn line written smoothly bad: Distance of 10 mm or more from start of handwriting test until drawn line written smoothly {Evaluation of Rubfastness}

Each pen body was used to write 20 circles having a diameter of about 2 cm in the shape of a spiral on Shiraoi high-quality paper having a basis mass of 64 g/m² (Nippon Paper Industries Co., Ltd.) followed one minute later by placing a sheet of Kimwipe (Nippon Paper Crecia Co., Ltd.) on the drawn line and rubbing five times with a 500 g mass placed thereon. This test was carried out in an environment at 25° C. and 60% RH. The evaluation criteria are indicated below.

Evaluation Criteria:

very good: No change from before rubbing good: Portions where drawn line is less legible in comparison with before rubbing observed only slightly moderate: Portions where drawn line is less legible in comparison with before rubbing observed bad: Entire drawn line less legible in comparison with before rubbing {Evaluation of Writing Feel}

Writing feel was evaluated according to the criteria indicated below by writing alphabet letters "VENENO" on commercially available PPC paper.

Evaluation Criteria:

very good: Extremely smooth good: Smooth moderate: Feel somewhat heavy bad: Heavy The results are shown in Tables 1 to 4. Note that, in Table 1, the "Content ratio of dye in microspheres" was calculated according to the formula: (parts by mass of water-insoluble dye)/(parts by mass of water-insoluble dye+parts by mass of polymer component)×100.

TABLE 1

| | | Microspheres | | | | | | | | | |
|---|---|---|---|---|---|---|---|---|---|---|---|
| | | A | B | C | D | E | F | G | H | I | J |
| Dye (ppw) | Black: Oil Black 860 (Orient Chemical Industries Co., Ltd.) | 3.5 | 3.5 | 3.5 | 3.5 | 3.5 | 3.5 | | | | |
| | Blue: Valifast Blue 2620 (Orient Chemical Industries Co., Ltd.) | | | | | | | | | | |
| | Red: Valifast Red 1355 (Orient Chemical Industries Co., Ltd.) | | | | | | | 2.8 | 2.8 | 2.8 | 2.8 |
| | Yellow: Valifast Yellow 1101 (Orient Chemical Industries Co., Ltd.) | | | | | | | | | | |
| Solvent (ppw) | Ethyl acetate | 12.5 | 25 | 25 | 12.5 | 12.5 | 12.5 | | | | |
| | Benzyl alcohol | | | | | | | | | | |
| | Ethylene glycol monobenzyl ether | | | | | | | 11.5 | 11.5 | 11.5 | 11.5 |
| | Phenyl glycol | | | | | | | | | | |
| Polymer component (ppw) | Modified isocyanurate of hexamethylene diisocyanate | 8 | 8 | 8 | 6 | 15 | 4 | | | | |
| | Trimethylolpropane (1 mole) adduct of diphenylmethane diisocyanate (3 moles) | | | | | | | 7.2 | 7.2 | 9.6 | 1.2 |
| | Modified allophanate of hexamethylene diisocyanate | | | | | | | | | | 6.0 |

TABLE 1-continued

| | | | | | | | | | | |
|---|---|---|---|---|---|---|---|---|---|---|
| Methylol melamine | | | | | | | | | | |
| Content ratio of dye in microspheres (mass %) | 29.7 | 29.7 | 29.7 | 36.8 | 18.9 | 46.7 | 28.0 | 28.0 | 22.6 | 28.0 |
| Temperature during polymerization (° C.) | 60 | 60 | 90 | 60 | 60 | 60 | 60 | 90 | 60 | 60 |
| Polymerization time (min) | 360 | 360 | 180 | 360 | 360 | 360 | 360 | 180 | 360 | 360 |
| Degree of circularity | 0.95 | 0.81 | 0.79 | 0.94 | 0.97 | 0.56 | 0.99 | 0.88 | 0.96 | 0.68 |
| 10% strength (MPa) | — | — | — | 8.2 | 32.1 | — | 18.4 | — | 25.3 | 4.5 |
| Degree of dispersion | 1.12 | 1.36 | 1.78 | 1.15 | 1.10 | 1.54 | 1.16 | 1.81 | 1.13 | 1.39 |

| | | Microspheres | | | | | | | | |
|---|---|---|---|---|---|---|---|---|---|---|
| | | K | L | M | N | O | P | Q | R | S | T |
| Dye (ppw) | Black: Oil Black 860 (Orient Chemical Industries Co., Ltd.) | | | | | | | | | | |
| | Blue: Valifast Blue 2620 (Orient Chemical Industries Co., Ltd.) | | 2.4 | 2.4 | 2.4 | 2.4 | 2.4 | 2.4 | | | |
| | Red: Valifast Red 1355 (Orient Chemical Industries Co., Ltd.) | 2.8 | | | | | | | | | |
| | Yellow: Valifast Yellow 1101 (Orient Chemical Industries Co., Ltd.) | | | | | | | | 4 | 4 | 4 |
| Solvent (ppw) | Ethyl acetate | | | | | | | | | | |
| | Benzyl alcohol | | 9.6 | 20 | 20 | 20 | 20 | 9.6 | | | |
| | Ethylene glycol monobenzyl ether | 11.5 | | | | | | | | | |
| | Phenyl glycol | | | | | | | | 16 | 16 | 16 |
| Polymer component (ppw) | Modified isocyanurate of hexamethylene diisocyanate | | | | | | | | | | |
| | Trimethylolpropane (1 mole) adduct of diphenylmethane diisocyanate (3 moles) | 3.6 | | | | | | | | | |
| | Modified allophanate of hexamethylene diisocyanate | | | | | | | | | | |
| | Methylol melamine | | 7.6 | 7.6 | 7.6 | 9.6 | 12.8 | 3.8 | 8.4 | 8.4 | 4.2 |
| Content ratio of dye in microspheres (mass %) | | 43.8 | 24.0 | 24.0 | 24.0 | 20.0 | 15.8 | 38.7 | 32.3 | 32.3 | 48.8 |
| Temperature during polymerization (° C.) | | 60 | 70 | 70 | 90 | 70 | 70 | 70 | 70 | 90 | 70 |
| Polymerization time (min) | | 360 | 50 | 50 | 20 | 50 | 50 | 50 | 50 | 20 | 50 |
| Degree of circularity | | 0.55 | 0.98 | 0.63 | 0.69 | 0.98 | 0.96 | 0.52 | 0.96 | 0.85 | 0.49 |
| 10% strength (MPa) | | — | 15.4 | — | — | 23.8 | 33.3 | — | 10.3 | — | — |
| Degree of dispersion | | 1.71 | 1.21 | 1.48 | 1.75 | 1.34 | 1.28 | 1.49 | 1.28 | 1.86 | 1.63 |

TABLE 2

| | | Ex. 1 | Ex. 2 | Ex. 3 | Ex. 4 | Comp. Ex. 1 | Comp. Ex. 2 | Ex. 5 | Ex. 7 | Ex. 8 | Ex. 9 | Comp. Ex. 3 |
|---|---|---|---|---|---|---|---|---|---|---|---|---|
| Content (ppw) | Microspheres | 15 | 15 | 15 | 15 | 15 | 15 | 15 | 15 | 15 | 15 | 15 |
| | Thickener | 0.18 | 0.18 | 0.18 | 0.18 | 0.18 | 0.18 | 0.18 | 0.18 | 0.18 | 0.18 | 0.18 |
| | Phosphate ester | 0.5 | 0.5 | 0.5 | 0.5 | 0.5 | 0.5 | 0.5 | 0.5 | 0.5 | 0.5 | 0.5 |
| | Preservative | 0.2 | 0.2 | 0.2 | 0.2 | 0.2 | 0.2 | 0.2 | 0.2 | 0.2 | 0.2 | 0.2 |
| | Corrosion inhibitor | 0.3 | 0.3 | 0.3 | 0.3 | 0.3 | 0.3 | 0.3 | 0.3 | 0.3 | 0.3 | 0.3 |
| | pH adjuster | 0.1 | 0.1 | 0.1 | 0.1 | 0.1 | 0.1 | 0.1 | 0.1 | 0.1 | 0.1 | 0.1 |
| | Water-soluble organic solvent | 15 | 15 | 15 | 15 | 15 | 15 | 15 | 15 | 15 | 15 | 15 |
| | Water | 68.72 | 68.72 | 68.72 | 68.72 | 68.72 | 68.72 | 68.72 | 68.72 | 68.72 | 68.72 | 68.72 |
| Microsphere details | Type | A | B | C | D | E | F | G | H | I | J | K |
| | Degree of circularity | 0.95 | 0.81 | 0.79 | 0.94 | 0.97 | 0.56 | 0.99 | 0.88 | 0.96 | 0.68 | 0.55 |
| | 10% strength (MPa) | — | — | — | 8.2 | 32.1 | — | 18.4 | — | 25.3 | 4.5 | — |
| | Degree of dispersion | 1.12 | 1.36 | 1.78 | 1.15 | 1.10 | 1.54 | 1.16 | 1.81 | 1.13 | 1.39 | 1.71 |
| Ballpoint pen evaluation | Initial writability | very good | good | good | good | very good | bad | very good | good | very good | moderate | bad |
| | Rubfastness | very good | — | — | very good | bad | — | very good | — | moderate | very good | — |
| | Writing feel | very good | very good | moderate | very good | very good | good | very good | moderate | very good | good | moderate |

| | | Ex. 11 | Ex. 13 | Ex. 14 | Ex. 15 | Comp. Ex. 5 | Comp. Ex. 6 | Ex. 16 | Ex. 17 | Comp. Ex. 8 |
|---|---|---|---|---|---|---|---|---|---|---|
| Content (ppw) | Microspheres | 15 | 15 | 15 | 15 | 15 | 15 | 15 | 15 | 15 |
| | Thickener | 0.18 | 0.18 | 0.18 | 0.18 | 0.18 | 0.18 | 0.18 | 0.18 | 0.18 |
| | Phosphate ester | 0.5 | 0.5 | 0.5 | 0.5 | 0.5 | 0.5 | 0.5 | 0.5 | 0.5 |
| | Preservative | 0.2 | 0.2 | 0.2 | 0.2 | 0.2 | 0.2 | 0.2 | 0.2 | 0.2 |

TABLE 2-continued

|  |  |  |  |  |  |  |  |  |  |
|---|---|---|---|---|---|---|---|---|---|
|  | Corrosion inhibitor | 0.3 | 0.3 | 0.3 | 0.3 | 0.3 | 0.3 | 0.3 | 0.3 | 0.3 |
|  | pH adjuster | 0.1 | 0.1 | 0.1 | 0.1 | 0.1 | 0.1 | 0.1 | 0.1 | 0.1 |
|  | Water-soluble organic solvent | 15 | 15 | 15 | 15 | 15 | 15 | 15 | 15 | 15 |
|  | Water | 68.72 | 68.72 | 68.72 | 68.72 | 68.72 | 68.72 | 68.72 | 68.72 | 68.72 |
| Microsphere details | Type | L | M | N | O | P | Q | R | S | T |
|  | Degree of circularity | 0.98 | 0.63 | 0.69 | 0.98 | 0.96 | 0.52 | 0.96 | 0.85 | 0.49 |
|  | 10% strength (MPa) | 15.4 | — | — | 23.8 | 33.3 | — | 10.3 | — | — |
|  | Degree of dispersion | 1.21 | 1.48 | 1.75 | 1.34 | 1.28 | 1.49 | 1.28 | 1.86 | 1.63 |
| Ballpoint pen evaluation | Initial writability | very good | moderate | moderate | very good | very good | bad | very good | good | bad |
|  | Rubfastness | very good | — | — | good | bad | — | very good | — | — |
|  | Writing feel | very good | good | moderate | very good | very good | good | very good | moderate | moderate |

TABLE 3

|  |  | Ex. 6 | Ex. 10 | Comp. Ex. 4 | Ex. 12 | Comp. Ex. 7 |
|---|---|---|---|---|---|---|
| Content (ppw) | Microspheres | 15 | 15 | 15 | 15 | 15 |
|  | Thickener |  |  |  |  |  |
|  | Phosphate ester |  |  |  |  |  |
|  | Preservative | 0.2 | 0.2 | 0.2 | 0.2 | 0.2 |
|  | Corrosion inhibitor |  |  |  |  |  |
|  | pH adjuster | 0.1 | 0.1 | 0.1 | 0.1 | 0.1 |
|  | Water-soluble organic solvent | 3 | 3 | 3 | 3 | 3 |
|  | Water | 81.7 | 81.7 | 81.7 | 81.7 | 81.7 |
| Microsphere details | Type | G | J | K | L | Q |
|  | Degree of circularity | 0.99 | 0.68 | 0.55 | 0.98 | 0.52 |
|  | 10% strength (MPa) | 18.4 | 4.5 | — | 15.4 | — |
|  | Degree of dispersion | 1.16 | 1.39 | 1.71 | 1.21 | 1.49 |
| Felt tip pen evaluation | Initial writability | very good | moderate | x | very good | bad |
|  | Rubfastness | very good | very good | — | very good | — |
|  | Writing feel | very good | good | moderate | very good | good |

TABLE 4

|  |  | Ex. 18 |  | Ex. 19 |  |
|---|---|---|---|---|---|
| Content (ppw) | Microspheres | 12 | 6 | 12 | 6 |
|  | Thickener |  | 0.8 |  |  |
|  | Phosphate ester |  | 0.5 |  |  |
|  | Preservative |  | 0.2 |  | 0.2 |
|  | Corrosion inhibitor |  | 0.3 |  |  |
|  | pH adjuster |  | 0.1 |  | 0.1 |
|  | Water-soluble organic solvent |  | 15 |  | 3 |
|  | Water |  | 65.72 |  | 81.7 |
| Microsphere details | Type | L | R | L | R |
|  | Degree of circularity | 0.98 | 0.96 | 0.98 | 0.96 |
|  | 10% strength (MPa) | 15.4 | 10.3 | 15.4 | 10.3 |
|  | Degree of dispersion | 1.21 | 1.18 | 1.21 | 1.28 |
| Ballpoint pen evaluation | Initial writability | very good |  |  |  |
|  | Rubfastness | very good |  |  |  |
|  | Writing feel | very good |  |  |  |
| Felt tip pen evaluation | Initial writability |  |  | very good |  |
|  | Rubfastness |  |  | very good |  |
|  | Writing feel |  |  | very good |  |

It can be understood from Table 1 that, when a comparison is made between Microspheres A to C and F, the circularity coefficient can be made to approach 1 by decreasing the amount of solvent used and/or increasing the content of polymer component. In addition, it can be understood that the dispersion degree coefficient can be reduced by carrying out the polymerization reaction at a low temperature and for a long period of time and/or increasing the content of polymer component. In addition, similar trends can also be confirmed between Microspheres G, H and K, between Microspheres L, M, N and Q, and between Microspheres R to T.

In addition, it can also be understood from Table 1 that, when a comparison is made among Microspheres A, D and E, 10% strength can be increased, circularity coefficient can be made to approach 1 and dispersion degree coefficient can be decreased by increasing the content of polymer component. In addition, similar trends can be confirmed between Microspheres G and I, and between Microspheres L, O and P.

In addition, when a comparison is made between Microspheres G and J, it can be understood that 10% strength and degree of circularity decrease when a majority of the trimethylolpropane (I mole) adduct of diphenylmethane diisocyanate (3 moles) is replaced with a modified allophanate of hexamethylene diisocyanate as an auxiliary prepolymer. On the basis thereof, it can be understood that 10% strength and circularity coefficient can be adjusted by adding auxiliary monomer or prepolymer.

Moreover, it can be understood from Table 2 that, with respect to ballpoint pens, initial writability improves the larger 10% strength and/or the closer the circularity coefficient approaches 1, that writing feel improves the smaller the degree of dispersion, and that rubfastness improves the smaller 10% strength. In addition, it can be understood from Table 3 that similar trends are observed for felt tip pens as well. Moreover, when both results are combined, it can be understood that microspheres directly contribute to initial writability, writing feel and rubfastness since similar results are obtained even if the compositions are different provided the same types of microspheres are used. This can be understood from Table 4 to also be applicable to the case in which matrices are composed of the same type of polymer and multiple types of microspheres are used that contain mutually different water-insoluble dyes.

REFERENCE SIGNS LIST

2 Matrix
4 Water-insoluble dye
10 Microsphere

The invention claimed is:

1. An aqueous ink composition for a writing instrument, containing:
   water, and
   microspheres each having a matrix composed of a polymer and a water-insoluble dye;
   wherein the water-insoluble dye is more densely present within the matrix than on the surface of the matrix, and
   wherein 10% strength of the microspheres as determined by a micro-compression test is 5 MPa to 30 MPa.

2. The aqueous ink composition for a writing instrument according to claim 1, wherein circularity coefficient of the microspheres as measured by image analysis is 0.6 to 1.0.

3. The aqueous ink composition for a writing instrument according to claim 1, wherein the dispersion degree coefficient of the microspheres as measured by laser diffraction is 1.0 to 1.8.

4. The aqueous ink composition for a writing instrument according to claim 1, wherein the content of the water-insoluble dye in the microspheres is 10 mass % to 45 mass %.

5. The aqueous ink composition for a writing instrument according to claim 1, wherein the mean particle diameter of the microspheres as measured by laser diffraction is 0.3 to 3.0 μm.

6. An aqueous ink composition for a writing instrument, containing:
   water, and
   microspheres each having a matrix composed of a polymer and a water-insoluble dye;
   wherein the water-insoluble dye is more densely present within the matrix than on the surface of the matrix, and
   wherein 10% strength of the microspheres as determined by a micro-compression test is 5 Pa to 30Mpa,
   wherein the microspheres are at least two types of microspheres,
   wherein the matrix of one type of microspheres and the matrix of the other type of microspheres are composed with the same type of polymer, and wherein the water-insoluble dye of the one type of microspheres and the water insoluble-dye of the other type of microspheres are different.

7. A writing instrument,
   wherein the writing instrument at least comprises an ink reservoir, a writing portion and a held portion, and
   wherein the ink reservoir stores the aqueous ink composition according to claim 1.

* * * * *